United States Patent
Lee et al.

(10) Patent No.: US 9,310,781 B2
(45) Date of Patent: Apr. 12, 2016

(54) APPARATUS AND METHOD FOR INTERACTION BETWEEN CONTENT AND OLFACTORY RECOGNITION DEVICE

(71) Applicant: ELECTRONICS AND TELECOMMUNICATIONS RESEARCH INSTITUTE, Daejeon (KR)

(72) Inventors: Hae-Ryong Lee, Daejeon (KR); Hyung-Gi Byun, Gyeonggi-do (KR); Jeong-Do Kim, Gyeonggi-do (KR); Dong-Wan Ryoo, Daejeon (KR); Jun-Seok Park, Daejeon (KR); Jeon-Woo Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 278 days.

(21) Appl. No.: 13/718,174

(22) Filed: Dec. 18, 2012

(65) Prior Publication Data

US 2013/0154797 A1 Jun. 20, 2013

(30) Foreign Application Priority Data

Dec. 19, 2011 (KR) .......................... 10-2011-0137589

(51) Int. Cl.
*G05B 1/00* (2006.01)
*G06F 3/00* (2006.01)

(52) U.S. Cl.
CPC . *G05B 1/00* (2013.01); *G06F 3/002* (2013.01)

(58) Field of Classification Search
CPC ........ G06F 3/002; G05B 1/00; H04N 21/422; H04N 21/47205; H04N 21/482
USPC .......................................... 340/5.74; 345/156
See application file for complete search history.

(56) References Cited

U.S. PATENT DOCUMENTS

2003/0056569 A1\* 3/2003 Jansen .......................... 73/23.34
2005/0278224 A1 12/2005 Bannai et al.
(Continued)

FOREIGN PATENT DOCUMENTS

KR 1020000015294 A 3/2000
KR 1020010082198 A 8/2001
(Continued)

OTHER PUBLICATIONS 1451.4 IEEE Standard for a Smart Transducer Interface for Sensors and Actuators, Mixed-Mode Communication Protocls and Transducer Electronic Data Sheets (TEDS) Formats, Institute of Electrical and Electronics Engineers, Inc. copyright 2004, ISBN 0-7381-4007-4 SH95225.\*

*Primary Examiner* — Fekadeselassie Girma
*Assistant Examiner* — Stephen Burgdorf
(74) *Attorney, Agent, or Firm* — Ladas & Parry LLP

(57) ABSTRACT

Disclosed herein is an apparatus and method for interaction between content and an olfactory recognition device. In the method for interaction between an olfactory recognition device and a content device, the method allows the olfactory recognition device to interact with the content device. If a connection to the content device has been made to enable data communication with the content device, an open signal is transmitted to the content device. As a response to the open signal, an approval signal is received from the content device. A device information datasheet that is information about the olfactory recognition device is transmitted to the content device in response to the approval signal. An acknowledgement signal is received from the content device.

11 Claims, 8 Drawing Sheets

(56) References Cited

U.S. PATENT DOCUMENTS

| | | | |
|---|---|---|---|
| 2007/0115796 A1* | 5/2007 | Jeong et al. | 370/203 |
| 2007/0126927 A1* | 6/2007 | Yun et al. | 348/473 |
| 2007/0233318 A1* | 10/2007 | Lei | 700/245 |
| 2008/0167896 A1* | 7/2008 | Fast et al. | 705/1 |
| 2008/0289704 A1* | 11/2008 | Verstegen et al. | 137/560 |
| 2009/0292469 A1 | 11/2009 | Son et al. | |
| 2009/0293211 A1* | 12/2009 | Spungin | 15/3 |
| 2011/0181421 A1* | 7/2011 | Nabata et al. | 340/573.1 |
| 2011/0264394 A1* | 10/2011 | Hollander et al. | 702/104 |

FOREIGN PATENT DOCUMENTS

| | | | |
|---|---|---|---|
| KR | 1020060047804 A | 5/2006 | |
| KR | 10-0740873 B1 | 12/2007 | |
| KR | 1020110030999 A | 3/2011 | |
| KR | 1020120007158 A | 1/2012 | |
| WO | 00/15268 A1 | 3/2000 | |
| WO | WO 2010092649 A1 * | 8/2010 | G08B 21/14 |

* cited by examiner

| FIELD NAME | DESCRIPTION |
|---|---|
| BASIC INFORMATION OF SENSOR | THIS INDICATES TEMPLATE NUMBER OF METADATA AND TYPE OF SENSOR |
| INFORMATION OF SENSOR | THIS INDICATES INFORMATION OF SENSOR AND INDICATES OUTPUT OF SIGNAL MEASURED AS INFORMATION OF SENSOR, SENSOR RESISTANCE, RESPONSE TIME, ETC. |
| LIMITATION OF SENSOR | THIS INDICATES INFORMATION ABOUT LIMITATION OF SENSOR |
| INFORMATION OF CALIBRATION | THIS INDICATES CALIBRATION OF SENSOR |

FIG. 2

APPARATUS AND METHOD FOR INTERACTION BETWEEN CONTENT AND OLFACTORY RECOGNITION DEVICE

CROSS REFERENCE TO RELATED APPLICATION

This application claims the benefit of Korean Patent Application No. 10-2011-0137589, filed on Dec. 19, 2011, which is hereby incorporated by reference in its entirety into this application.

BACKGROUND OF THE INVENTION

1. Technical Field

The present invention relates generally to an apparatus and method for interaction between content and an olfactory recognition device. More particularly, the present invention relates to an apparatus and method for interaction between content and an olfactory recognition device, which overcome the limitations of existing content, such as audio-visual and text-centered content unilaterally provided to a user, and which enable content to recognize an odor provided by a user or a spontaneously generated odor, and then cause a reaction to the odor in the content.

2. Description of the Related Art

Details described in this part merely provide background information related to embodiments of the present invention and do not necessarily configure conventional technologies.

Existing content is two-dimensional content, such as audio-visual and text-centered content that is unilaterally provided to users, and has limited interaction.

Recently, games that recognize users' motion or reaction states and allow the users to interact with content using a recognition device, such as a camera or an acceleration sensor, have begun to be provided.

Meanwhile, the actual applications of olfactory interaction technology are limited due to the fundamental restriction of gas sensors, the absence of a definition of common and compatible interface methods and olfactory recognition interaction, and the restriction of a scent device.

SUMMARY OF THE INVENTION

Accordingly, the present invention has been made keeping in mind the above problems occurring in the prior art, and an object of the present invention is to provide an apparatus and method for interaction between content and an olfactory recognition device, which overcome the limitations of existing content, such as audio-visual and text-centered content unilaterally provided to a user, and which enable content to recognize an odor provided by the user or a spontaneously generated odor and then cause a reaction to the odor in the content.

In accordance with an aspect of the present invention to accomplish the above object, there is provided a method for interaction between an olfactory recognition device and a content device, the method allowing the olfactory recognition device to interact with the content device, including if a connection to the content device has been made to enable data communication with the content device, transmitting an open signal to the content device; receiving, as a response to the open signal, an approval signal from the content device; transmitting a device information datasheet that is information about the olfactory recognition device to the content device in response to the approval signal; and receiving an acknowledgement signal from the content device.

Preferably, information about the olfactory recognition device may include at least one of basic information of a sensor, information of the sensor, limitation information of the sensor, and information of calibration.

Preferably, the method of allowing the olfactory recognition device to interact with the content device may include one or more of an automatic mode, a manual mode, and a reference mode.

In accordance with another aspect of the present invention to accomplish the above object, there is provided an olfactory recognition system for recognizing an odor provided by a user or a spontaneously generated odor and causing a reaction to the odor in content, including an olfactory recognition device including a plurality of gas sensors, the olfactory recognition device recognizing the odor and generating data as a result of the recognition; a content device for receiving the recognition result data and then producing a reaction to the recognition result data and an interface for bidirectionally performing transmission and reception of data including the recognition result data between the olfactory recognition device and the content device.

Preferably, the olfactory recognition device may include one or more of a device module, a device information service stack, a device information datasheet, and a device communication module, and the device module comprises a gas sensor for olfactory recognition, drives the gas sensor, and controls an overall function of the device module including a communication function, the device information service stack provides functions and service functions for information exchange between the olfactory recognition device and the content device, and the device information datasheet includes electrical characteristics and sensor characteristics of the gas sensor for olfactory recognition.

Preferably, the device information datasheet may include a metadata structure of information about the gas sensor, the metadata structure including basic information of the sensor, information of the sensor, limitation information of the sensor, and information of calibration, and the basic information of the sensor indicates a template number of metadata and a type of the sensor, the information of the sensor indicates output of a signal measured as information about the sensor, resistance of the sensor, and a response time, the limitation information of the sensor indicates information about limitations of the sensor, and the information of calibration indicates information about calibration of the sensor.

BRIEF DESCRIPTION OF THE DRAWINGS

The above and other objects, features and advantages of the present invention will be more clearly understood from the following detailed description taken in conjunction with the accompanying drawings, in which:

FIG. 2 is a diagram showing the basic configuration of the device information datasheet of a gas sensor for an olfactory recognition device;

DESCRIPTION OF THE PREFERRED EMBODIMENTS

Figure 1:
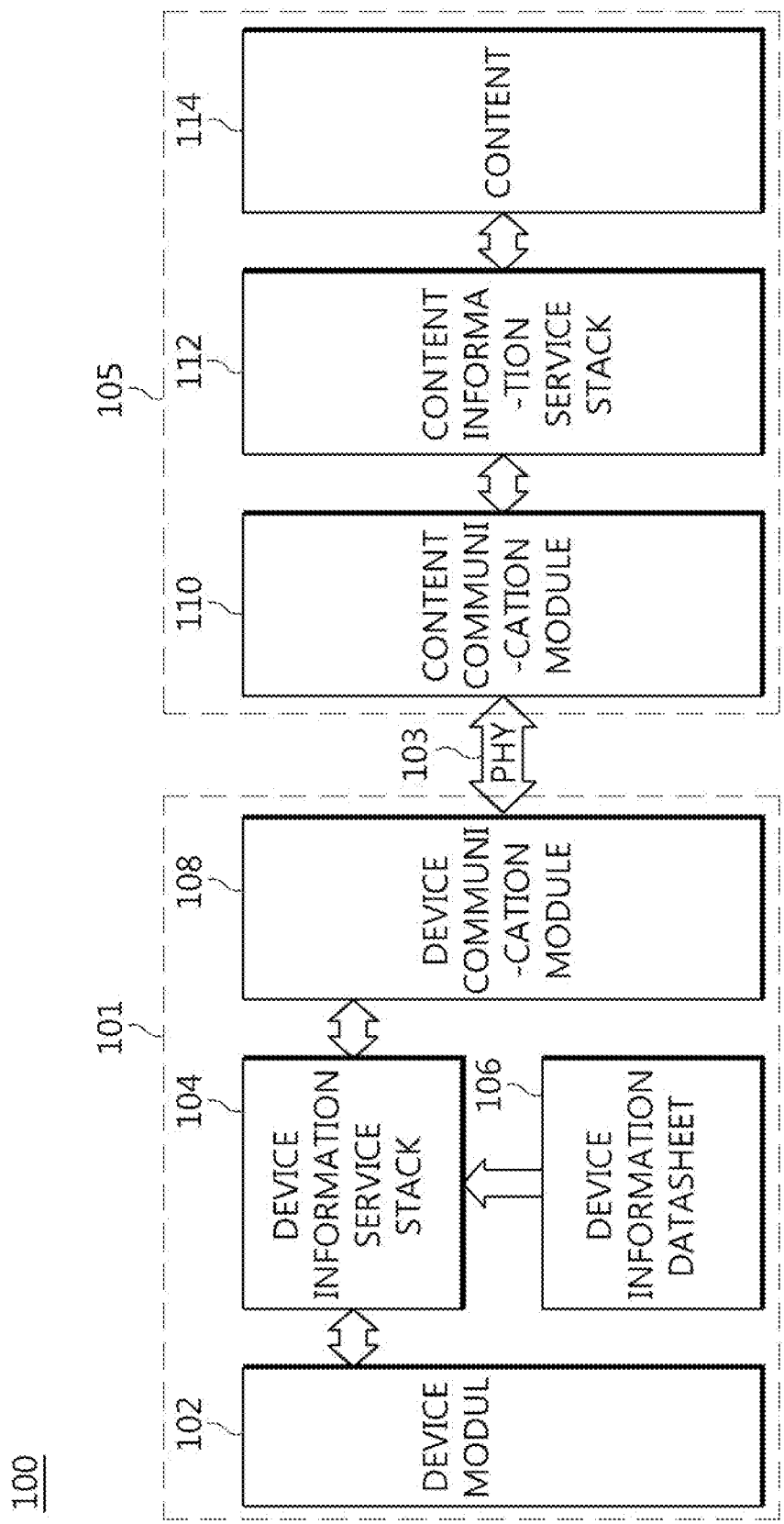
FIG. 1 is a diagram showing the configuration of an interaction model between content and an olfactory recognition device.

Hereinafter, embodiments of the present invention will be described in detail with reference to the attached drawings. Reference now should be made to the drawings, in which the same reference numerals are used throughout the different drawings to designate the same or similar components. The present invention will be described in detail below with reference to the accompanying drawings. In the following description, redundant descriptions and detailed descriptions of known functions and elements that may unnecessarily make the gist of the present invention obscure will be omitted.

Further, terms such as "first", "second", "A", "B", "(a)", and "(b)" may be used to describe the components of the present invention. These terms are merely used to distinguish relevant components from other components, and the substance, sequence or order of the relevant components is not limited by the terms. It should be understood that a representation indicating that a first component is "linked", "coupled", or "connected" to a second component includes not only the case where the first component is directly coupled or connected to the second component but also cases where a third component is "linked", "coupled" or "connected" between the first and second components.

FIG. 1 is a diagram showing the overall configuration of a reference model for interaction between an olfactory recognition device and content, which is defined in the present embodiment.

An interaction model between content for realistic content and an olfactory recognition device is intended to provide a basic model structure that overcomes the limitations of existing content, such as audio-visual and text-centered content unilaterally provided to a user, and that enables content to recognize an odor provided by the user or a spontaneously generated odor and then causes a reaction to the odor in the content.

Principal terms that will be used in the present embodiment are described as follows.

The term "olfactory display" refers to general technology for utilizing the olfactory sense as media information.

The term "olfactory recognition system" refers to a device that is capable of recognizing odors and that is defined as an olfactory recognition system or an olfactory recognition device as long as it can recognize any odor regardless of whether the odor is a single odor or a composite odor. However, the olfactory recognition system does not necessarily refer to a system that exactly detects which kind of odor is present. Typically, such olfactory recognition systems include a gas sensor, a device such as an electronic nose, a sensor, etc.

The term "olfactory interaction" refers to a series of procedures and states including input/output between a user and an environment, occurring while the user is experiencing olfactory information (odor information) in a virtual or an actual environment using a physical device functioning to recognize and represent olfactory information, and reactions based on the input/output. In this regard, the case where a plurality of users intervene, cooperate with each other, and interact with one another in an environment having olfactory information is also included in the scope of olfactory interaction.

The term "realistic content" refers to content that is capable of increasing the reality and sensitivity of the user using various types of media, sensors, and equipment, in addition to the existing audio-visual information. Representative realistic media device and information, in addition to the audio-visual information, may include, for example, a touch device, and a scent device and a gas sensor that use olfactory interaction. In the description of the present embodiment, realistic content is also referred to as "content."

For standardization of a reference model, the following definitions and standardization are required.

1) Interaction reference model between an olfactory recognition device and a content device 2) Data processing structure and flow for the operation of the reference model 3) Standards of a device information datasheet that stores physical and electrical information of an olfactory recognition sensor 4) Data format for information transfer and operation between an olfactory recognition device and a content device 5) Standards of a device information service stack that defines functions required to operate the olfactory recognition system and perform information processing using content 6) Standards of a content information service stack that defines functions required to receive information from the olfactory recognition device and provide information to content 7) Definition of standards and interfaces of a communication module for communication between the olfactory recognition device and content The present embodiment defines 1) the reference model for interaction between the olfactory recognition device and content, and configuration conditions or the like of the reference model. Further, the present embodiment defines 2) the data processing structure and flow for the operation of the reference model. Furthermore, the present embodiment defines 7) the standards and interface of the communication module for communication between the olfactory recognition device and content.

The interaction model between the content and the olfactory recognition device mainly defines two types of models and a single physical interface method.

As shown in FIG. 1, the interaction model between the content and the olfactory recognition device includes an olfactory recognition device 101, a content device 105, and a physical interface 103.

Among these components, the olfactory recognition device 101 includes a device communication module 108, a device information service stack 104, a device information datasheet 106, and a device module 102. Meanwhile, a model for the content device 105 includes a content communication module 110, a content information service stack 112, and content 114.

The device module 102 includes a sensor unit (not shown), a sensor driving circuit unit (not shown), and a data acquisition and device control unit (not shown). The sensor unit is a part including a sensor for recognizing odors. Olfactory recognition sensors, also called gas sensors, include a Metal Oxide Semiconductor (MOS) sensor, a Quartz Crystal Microbalance (QCM) sensor, a Surface Acoustic Wave (SAW) sensor, a Conductive Polymer (CP) sensor, etc.

The MOS sensor is a gas sensor using oxide semiconductor and basically contains ZnO and $SnO_2$. The response of the sensor is measured as displacement in resistance occurring between two electrodes as a result of a chemical reaction on the surface of the oxide semiconductor. Further, the MOS sensor contains therein a heater for maintaining the operating temperature sensed on the surface of the oxide semiconductor at 250 to 400° C. This MOS sensor is advantageous in that the response speed is high, installation is facilitated, and excellent characteristics are exhibited even in corrosive gas and in humidity. The resistance of the MOS sensor varies according to the concentration of an odor or gas. In the present embodiment, it is preferable to convert resistance into a voltage using a driving circuit and use the voltage, but the configuration of the present invention is not limited to this embodiment.

The QCM sensor has, as output, frequency varying with an odor or gas, and such an operating frequency ranges from 10 to 30 MHz. The oscillation frequency of crystal linearly varies according to the Sauerbrey equation due to a load of additional mass in a polymer matrix caused by the absorption of molecules to be analyzed from gas. The sensor response is measured as a variation in the resonant frequency of an Oscillating Feedback Loop (OFL). The concentration range of the QCM sensor is limited to 10 ppm or more, is operable at normal temperature, and has high reproducibility.

The SAW sensor represents the displacement of mass by the displacement of frequency using a principle similar to that of the above-described QCM sensor. This sensor has a high frequency, such as a frequency of 600 MHz, as indicated in the name thereof.

The CP sensor is one of gas sensors that measure a variation in the resistance of a polymer film in a Direct Current (DC) form when gas is adsorbed. This CP sensor can be used at normal temperature, unlike the above-described MOS sensor, and is sensitive to temperature variations. The resistance of the CP sensor varies according to the concentration of an odor or gas. In the present embodiment, it is preferable to convert resistance into a voltage using a driving circuit and use the voltage.

A sensor unit may use one or more of such sensors, and may use various types of sensors together without needing to use a single type of sensor.

A sensor driving circuit unit may be designed differently depending on the above-described sensor type. In the present embodiment, the description of a detailed method of designing the sensor driving circuit will be omitted.

Even in the data acquisition and device control unit, circuits and methods for acquiring the data of the sensor can be designed differently depending on the above-described sensor type. Further, in the present embodiment, the description of the circuits and methods for acquiring the data of the sensor will be omitted.

The device information datasheet 106 will be described in detail. The device information datasheet includes electrical characteristics and sensor characteristics of each gas sensor for olfactory recognition, and such characteristic information must be able to be provided at the request of content. The device information datasheet must be stored in memory in which data is not erased even if power is not supplied. However, any type of memory can be used as long as data stored in the memory is not erased even if power is shut off.

The metadata structure of information about the gas sensor is mainly divided into four fields, which are shown in FIG. 2.

The basic information of the sensor indicates the template number of metadata and the type of the sensor. The information of the sensor indicates the output of a signal measured as the information of the sensor, the resistance of the sensor, the response time, etc. The limitation information of the sensor indicates limitations imposed on the characteristics or type of the sensor. The information of calibration indicates information about the calibration or correction of the sensor.

Figure 3:
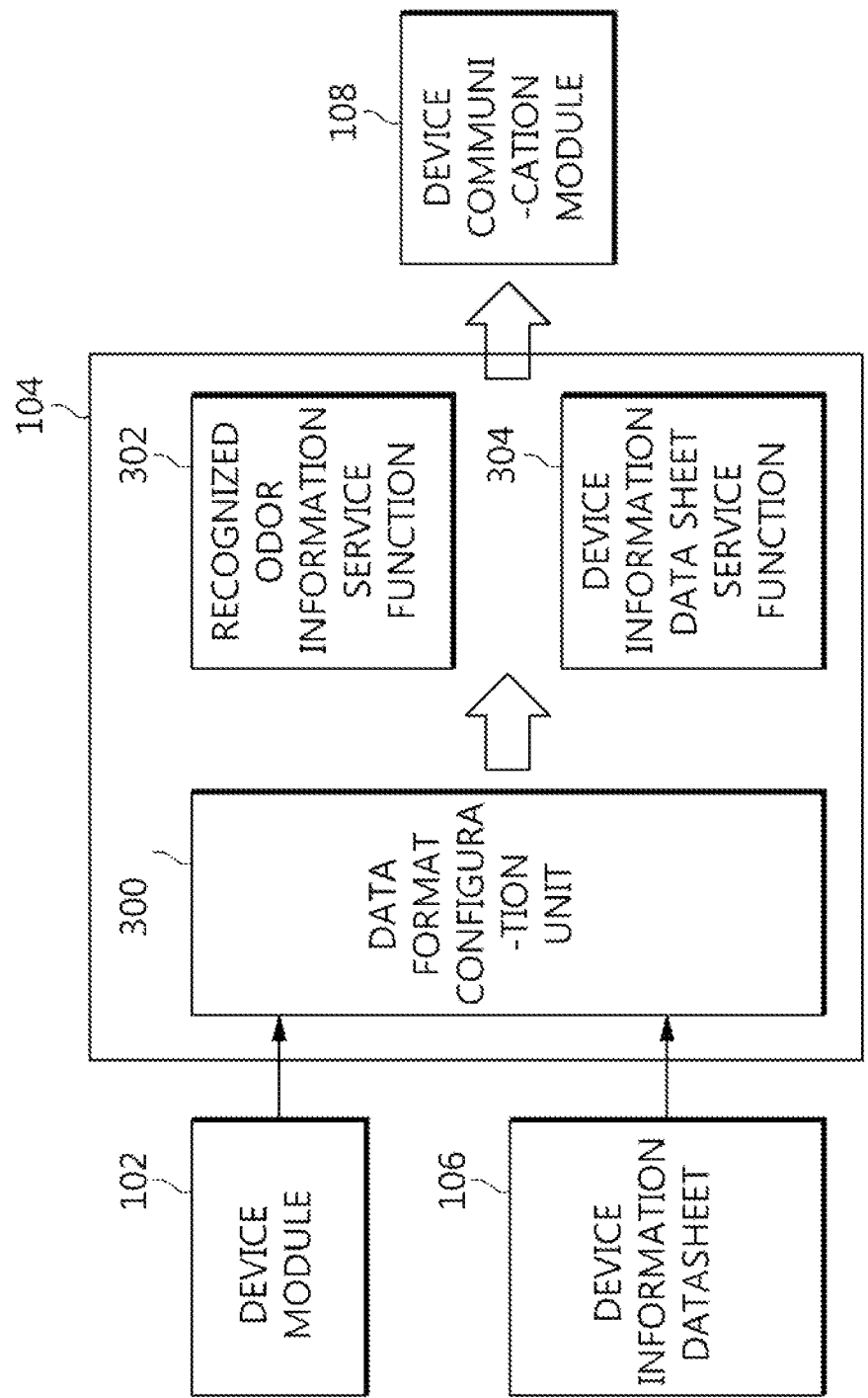
FIG. 3 is a diagram showing the basic configuration of a device information service stack.

FIG. 3 is a diagram showing the basic configuration of the device information service stack.

The device information service stack 104 provides functions, service functions, etc. for information exchange between the olfactory recognition device 101 and the content device 105. The device information service stack is mainly divided into three functions, that is, a data format configuration unit 300, a recognized odor information service function 302, and a device information datasheet service function 304.

The data format configuration unit 300 functions to convert measured and recognized odor information provided by the device module and device datasheet information provided by the device information datasheet into a specific information format configured in accordance with the present embodiment.

The recognized odor information service function 302 includes a function required to convert sensor data, which has been created as standard information or which has been converted, into a format that can be used by the content, a function required to transfer information from or to the content, etc.

The device information datasheet service function 304 includes a function required to transfer information provided by the device information datasheet to the content, etc.

Referring back to FIG. 1, the content device 105 includes the content communication module 110, the content information service stack 112, and the content 114.

The content information service stack 112 provides a function required to exchange information between the content device 105 and the olfactory recognition device 101, a service function required to serve recognized odor information to the content, etc.

The content information service stack 112 is mainly divided into two functions. One is a function required to convert a received data format into a format usable in content, and the other is a function required to receive information transferred from the olfactory recognition device. A data flow and a processing structure for processing these functions will be described in detail later.

As each of the device communication module 108 and the content communication module 110, any type of module can be used as long as it has a communication function capable of transmitting and receiving digital data. Examples of the usable communication module include 1-wire communication, Inter-Integrated Circuit (I2C), Serial Peripheral Interface (SPI), Universal Asynchronous Receiver Transmitter (UART), Recommended Standard-232 (RS-232), RS-485, Zigbee, Bluetooth, and Wireless-Fidelity (Wi-Fi) communication modules. From among these communication modules, a suitable one can be selected and used depending on the standards, purpose, and restrictions. As the physical interface 103, any type of interface can be used as long as it supports such communication modules.

Hereinafter, a structure for processing data between the content device 105 and the olfactory recognition device 101 will be described with reference to FIGS. 4 to 8.

A method for physical communication of the information interface 103 between the content device 105 and the olfactory recognition device 101 has been described as any of the 1-wire communication, I2C, SPI, UART, RS-232, RS-485, Zigbee, Bluetooth, and Wi-Fi communication methods, as described above. In this way, the transfer of various types of information is preferably performed using digital signals rather than analog signals, but the present invention is not necessarily limited thereto.

Methods for processing data between the content device and the olfactory recognition device are mainly divided into three structures. The three structures include a data processing structure for transferring initial information, a data processing structure for transferring an odor, and a data processing structure for changing a mode.

Figure 4:
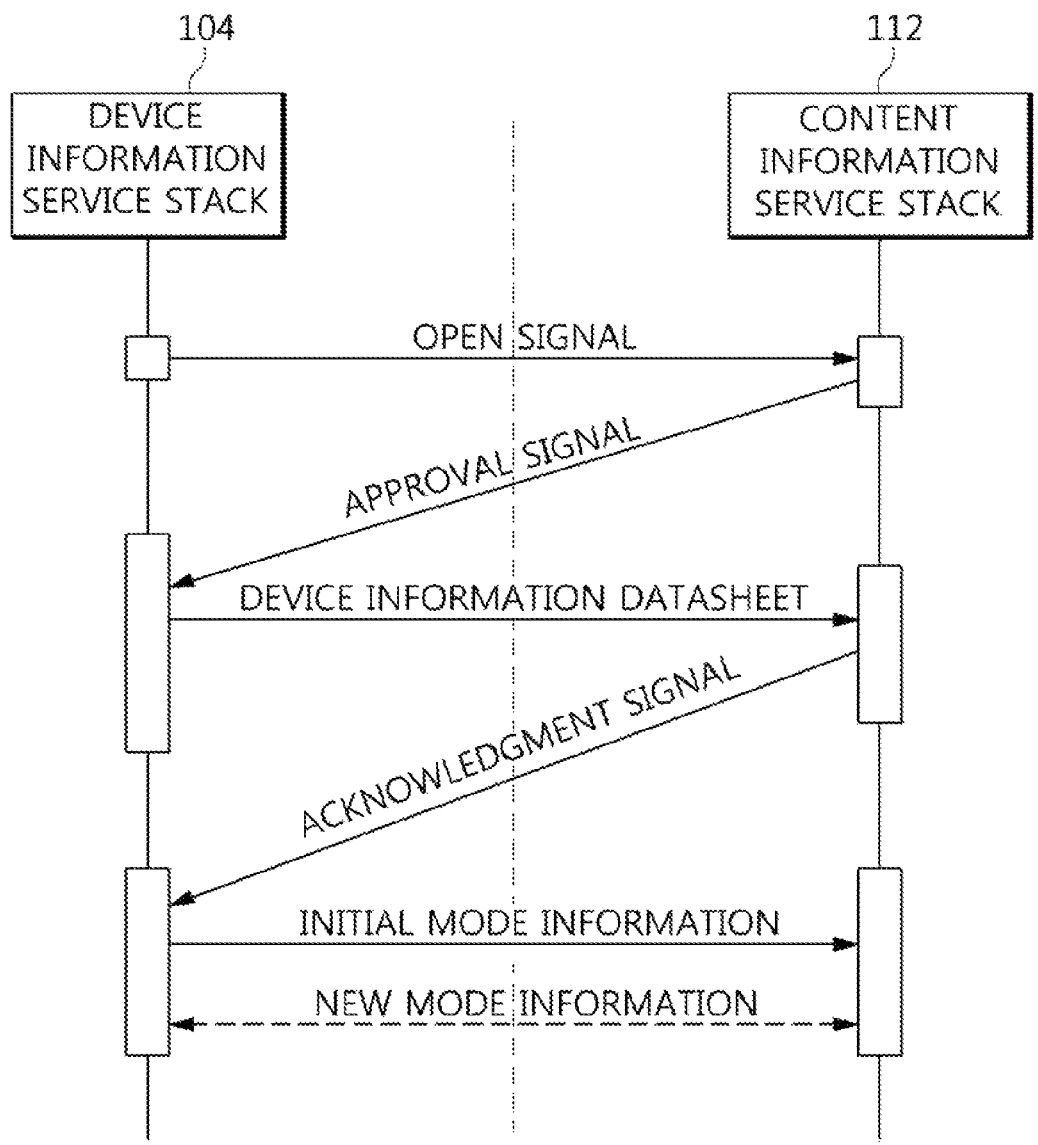
FIG. 4 is a diagram showing a data processing structure for transferring initial information.

FIG. 4 is a diagram showing the data processing structure for transferring initial information.

The transfer of initial information is automatically performed by the information service stack 104 of the olfactory recognition device immediately when the olfactory recognition device 101 and the content device 105 are connected to each other over a physical communication network. The device information service stack 104 of the olfactory recognition device 101 automatically transmits an open signal. After receiving the open signal, the content information service stack 112 of the content device 105 transmits an approval signal. After receiving the approval signal, the device information service stack 104 of the olfactory recognition device 101 transmits a device information datasheet to the content information service stack 112. The content information service stack 112 that has received the device information datasheet transmits an acknowledgement signal. After receiving this signal, the device information service stack 104 of the olfactory recognition device 101 transmits initial mode information. In order to use a new mode signal without using such an initial mode signal, there is a need only to immediately transmit a signal for new mode information.

It is preferable to design this procedure so that the procedure must be automatically performed after setting up a connection, but it is also possible to perform the procedure either manually or automatically in a scheduled manner so that after setting up a connection, the procedure is operated at the time point desired by the user or a manager.

Modes between the olfactory recognition device 101 and the content device 105 can mainly include two types, that is, a recognized odor information transfer mode and a shape mode for data to be transferred. Of these modes, the recognized odor information transfer mode has an automatic mode, a manual mode, and a reference mode.

Of the recognized odor information transfer modes, the automatic mode is a mode in which data is automatically transferred every set time, the manual mode is a mode in which recognized odor information is transferred whenever the content requires that information, and the reference mode is a mode in which the olfactory recognition device automatically transfers recognized odor information only when the recognized odor information is equal to or greater than a preset reference value, or only when the recognized odor information is equal to or less than the reference value. In the automatic mode, time information must be transferred together with the recognized odor information. Meanwhile, in the reference mode, the content device 105 must transfer the reference value to the olfactory recognition device 101.

Figure 5:
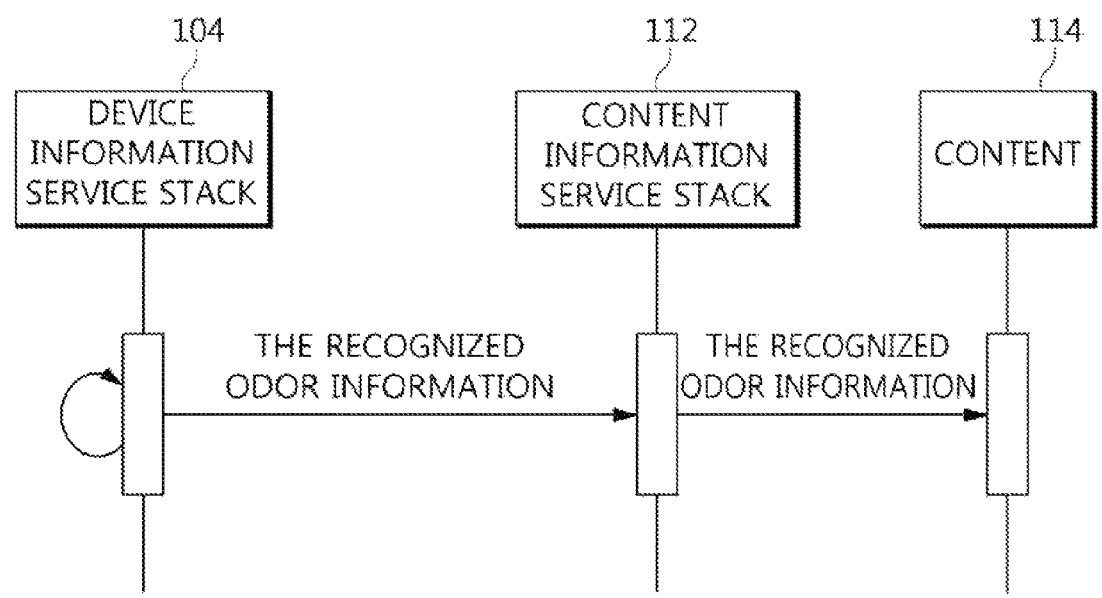
FIG. 5 is a diagram showing data flow in automatic mode for recognized odor information transfer.

Hereinafter, modes for the transfer of recognized odor information will be described. The recognized odor information transfer modes are mainly divided into the automatic mode and the manual mode. Of these modes, in the automatic mode, recognized odor information is sent to the content information service stack 112 every set time, and the content information service stack 112 that has received this information provides the recognized odor information to the content 114. FIG. 5 is a diagram showing a data flow in automatic mode for recognized odor information transfer.

Figure 6:
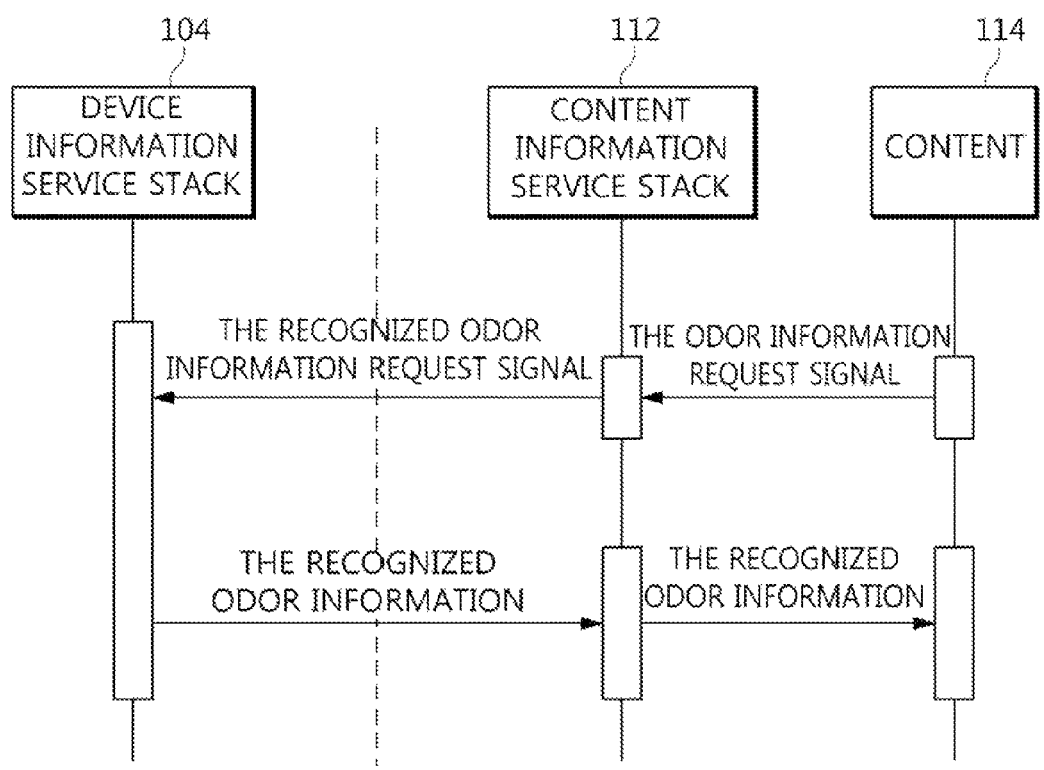
FIG. 6 is a diagram showing data flow in manual mode for recognized odor information transfer.

FIG. 6 is a diagram showing data flow in manual mode for recognized odor information transfer. The manual mode is a mode in which the content 114 requests recognized odor information from the content information service stack 112 using an odor information request signal whenever the recognized odor information is needed. The content information service stack 112 that has received this request must forward the odor information request signal to the device information service stack 104 of the olfactory recognition device. The device information service stack 104 of the olfactory recognition device that has received this signal transmits recognized odor information, and this information must be forwarded to the content 114 via the content information service stack 112.

Figure 7:
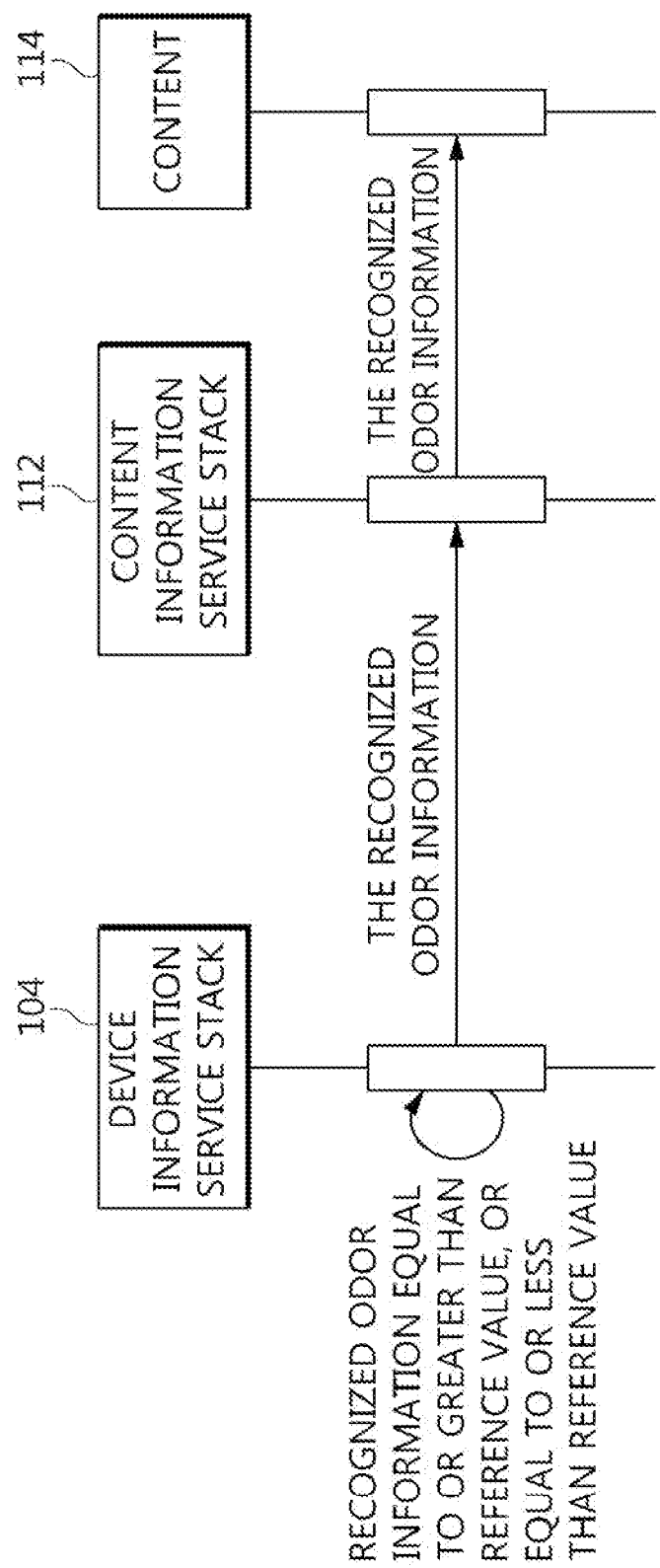
FIG. 7 is a diagram showing data flow in reference mode for recognized odor information transfer.

FIG. 7 is a diagram showing data flow in reference mode for recognized odor information transfer. The reference mode is a mode in which it is checked whether recognized odor information is equal to or greater than a reference value, or whether the recognized odor information is equal to or less than the reference value, and in which the device information service stack 104 of the olfactory recognition device 101 automatically provides recognized odor information to the content information service stack 112 only when a specific condition is satisfied.

Figure 8:
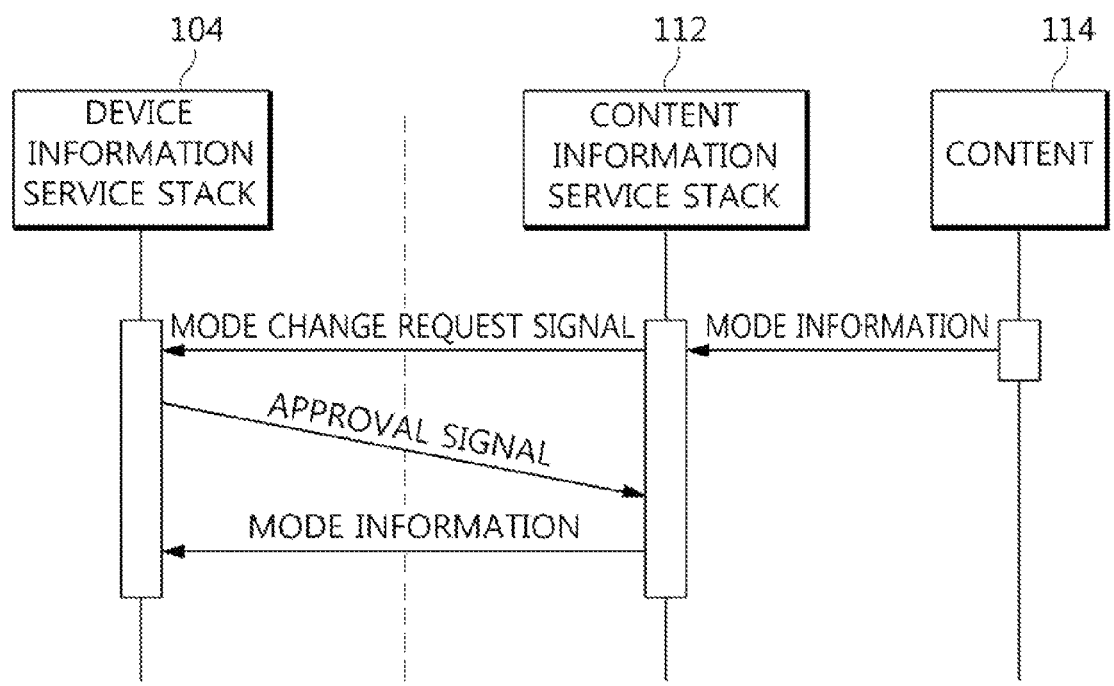
FIG. 8 is a diagram showing a data processing structure in recognized odor information transfer mode.

Meanwhile, as described above, the recognized odor information transfer modes are divided into the automatic mode, the manual mode, and the reference mode. The content device needs to change the mode depending on the configuration and operation of content. A data structure for changing the recognized odor information transfer mode is shown in FIG. 8. First, the content 114 that is intended to change the recognized odor information transfer mode transfers new mode information to the content information service stack 112. When transferring a mode change request signal to the device information service stack 104 of the olfactory recognition device, the device information service stack 104 of the olfactory recognition device provides an approval signal to the content information service stack 112. After receiving this signal, the content information service stack 112 transfers mode information desired to be changed to the device information service stack 104 of the olfactory recognition device.

In accordance with the embodiments of the present invention, there is an advantage in that the reality of existing content can be maximized.

In the above description, although all components constituting the embodiments of the present invention have been described as being combined into a single body or as being combined into and operated as a single body, the present invention is not necessarily limited by these embodiments. That is, one or more of all the components may be selectively combined and operated within the scope of the object of the present invention. Further, all the components may be individually implemented as independent hardware devices, but some or all of the components may also be selectively combined and implemented in the form of a computer program having program modules which perform some or all of the functions combined by one or more hardware devices. The code and code segments constituting the computer program may be easily inferred by those skilled in the art to which the present invention pertains. Such a computer program is stored in computer readable storage media and is read and executed by the computer, so that the embodiments of the present invention may be implemented. Examples of the storage media for storing the computer program may include magnetic recording media, optical recording media, carrier wave media, etc.

In the present specification, such terms as "comprise", "include" or "have" mean that the relevant components may be included unless differently defined, so that it should be understood that other components may be further included rather than being excluded. All terms used here including technical or scientific terms have the same meanings as the terms generally understood by those skilled in the art to which the present invention pertains. The terms identical to those defined in dictionaries for general use should be interpreted as having meanings identical to contextual meanings of the related art, and are not interpreted as being ideal or excessively formal meanings unless they are definitely defined in the present specification.

The above description is merely intended to illustratively describe the technical spirit of the present invention, and various changes and modifications can be made by those skilled in the art without departing from the essential features of the present invention. Therefore, the embodiments disclosed in the present invention are not intended to limit the technical spirit of the present invention, but are intended to describe the present invention. The scope of the spirit of the invention is not limited by these embodiments. The scope of the present invention should be defined by the accompanying claims and all technical spirits falling within the equivalent scope thereof should be interpreted as being included in the scope of the present invention.

What is claimed is:

1. An olfactory recognition system for recognizing an odor provided by a user or a spontaneously generated odor and causing a reaction to the odor in a realistic content, comprising:
   an olfactory recognition device including a plurality of gas sensors, the olfactory recognition device recognizing the odor and generating data as a result of the recognition,
      wherein the olfactory recognition device comprises a device module, a device information service stack, a device information datasheet, and a device communication module, and
      the device module comprises a gas sensor for olfactory recognition, drives the gas sensor, and controls an overall function of the device module including a communication function, the device information service stack provides functions and service functions for information exchange between the olfactory recognition device and the content device, and the device information datasheet includes electrical characteristics and sensor characteristics of the gas sensor for olfactory recognition;
   a content device for receiving the recognition result data and then producing a reaction to the recognition result data, wherein the reaction includes a modification of the realistic content in response to the recognition result data, and where realistic content includes visual content and olfactory content; and
   an interface for bidirectionally performing transmission and reception of data including the recognition result data between the olfactory recognition device and the content device,
   wherein a method of allowing the olfactory recognition device to interact with the content device is performed by one or more of an automatic mode, a manual mode, and a reference mode, and
   wherein when the realistic content facilitates a change in a recognized odor information transfer mode, if new mode information is transmitted to a content information service stack of the content device, and the content information service stack transmits a mode change request signal to a device information service stack of the olfactory recognition device, the device information service stack of the olfactory recognition device provides an approval signal to the content information service stack, and the content information service stack transmits mode information desired to be changed to the device information service stack of the olfactory recognition device.

2. The olfactory recognition system of claim 1, wherein:
   the device information datasheet includes a metadata structure of information about the gas sensor, the metadata structure including basic information of the sensor, information of the sensor, limitation information of the sensor, and information of calibration, and
   the basic information of the sensor indicates a template number of metadata and a type of the sensor, the information of the sensor indicates output of a signal measured as information about the sensor, resistance of the sensor, and a response time, the limitation information of the sensor indicates limitations of the sensor, and the information of calibration indicates information about calibration of the sensor.

3. The olfactory recognition system of claim 1, wherein the device information service stack provides some or all of the functions and the service functions for information exchange between the olfactory recognition device and the content device, and comprises a data format configuration unit, a recognized odor information service function, and a device information datasheet service function.

4. The olfactory recognition system of claim 3, wherein:
   the data format configuration unit functions to convert measured and recognized odor information provided by the device module, and device datasheet information provided by the device information datasheet into a format of information required by the realistic content,
   the recognized odor information service function includes a function required to convert sensor data converted into standard information into a format usable by the realistic content and a function required to transfer information from or to the content device, and
   the device information datasheet service function includes a function required to transfer information provided by the device information datasheet to the realistic content.

5. The olfactory recognition system of claim 1, wherein:
   the content device comprises a content communication module, a content information service stack, and the realistic content, and
   the content information service stack provides a function required to exchange information between the content device and the olfactory recognition device and a service function required to serve recognized odor information to the realistic content.

6. The olfactory recognition system of claim 1, wherein a method of processing data between the olfactory recognition device and the content device is performed by a data processing structure for transferring initial information, a data processing structure for transferring an odor information, and a data processing structure for changing a mode.

7. The olfactory recognition system of claim 1, wherein the data processing structure for transferring initial information is implemented using transfer of data between the device information service stack and a content information service stack of the content device, and is configured such that if the device information service stack transmits an open signal, the content information service stack having received the open signal receives an approval signal as a response to the open signal from the content device, and such that the device information service stack transmits to the content device the device information datasheet that is information about the olfactory recognition device in response to reception of the approval signal, receives an acknowledgement signal from the content device, and transmits initial mode information to the content information service stack.

8. The olfactory recognition system of claim 7, wherein the content information service stack transmits new mode information when the initial mode information is not used.

9. The olfactory recognition system of claim 1, wherein the automatic mode is configured such that recognized odor information is transmitted to a content information service stack of the content device every set time, and such that the content information service stack having received the recognized odor information provides the recognized odor information to realistic content.

10. The olfactory recognition system of claim 1, wherein the manual mode is a mode in which recognized odor information is requested from a content information service stack of the content device using an odor information request signal whenever the realistic content requires recognized odor information, and is configured such that the content information service stack having received the odor information request signal forwards the odor information request signal to a device information service stack of the olfactory recognition device, and such that the device information service stack of the olfactory recognition device having received the odor information request signal transmits recognized odor information, the recognized odor information being forwarded to realistic content via the content information service stack.

11. The olfactory recognition system of claim 1, wherein the reference mode is configured such that whether the recognized odor information is equal to or greater than a reference value, or whether the recognized odor information is equal to or less than the reference value is checked, and such that a device information service stack of the olfactory recognition device automatically provides recognized odor information to a content information service stack of the content device only when a specific condition is satisfied.

* * * * *